UNITED STATES PATENT OFFICE 2,437,389

OXAZOLIDONES AND PROCESS FOR MAKING THE SAME

August H. Homeyer, Webster Groves, Mo., assignor to Mallinckrodt Chemical Works, St. Louis, Mo., a corporation of Missouri No Drawing. Original application February 13, 1942, Serial No. 430,741. Divided and this application February 16, 1946, Serial No. 648,207

19 Claims. (Cl. 260—307)

This invention relates to five-membered ring compounds, and more particularly, to 2-oxazolidones.

This application is a division of my copending application Serial No. 430,741, filed February 13, 1942.

Among the objects of this invention are the preparation of new compounds of the 2-oxazolidone series; the provision of a convenient method for making 2-oxazolidones; and the provision of an improved method for the economical preparation of compounds of this type. Other objects will be in part obvious and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

According to the present invention, 2-oxazolidones are prepared by the reaction of a β-amino alcohol and an alkyl carbonate. The reaction may be represented by the following equation:

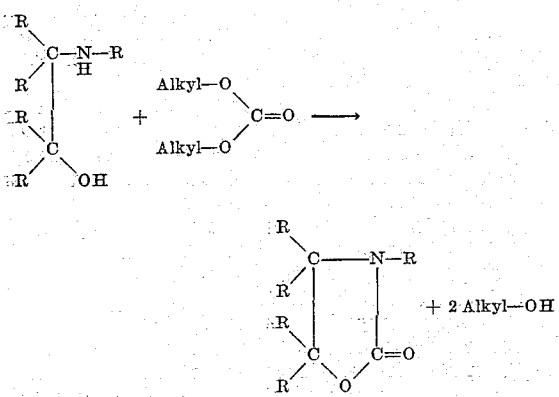

In the above equation, the R's are selected from hydrogen, alkyl radicals, hydroxy alkyl radicals and aryl radicals. The R's may be the same or different. Alkyl carbonates in general are suitable. Typical carbonates are diethyl carbonate, di-n-propyl carbonate, di-n-butyl carbonate and di-secondary butyl carbonate. Unsymmetrical carbonates can be used.

The reactants are heated together, and the alcohol formed is preferably removed by fractionation to force the reaction to completion. In many instances a small amount of a catalyst, consisting of an alkaline metallic compound, is necessary to cause the reaction to take place at ordinarily available conditions. Suitable catalysts are, for example, sodium methylate, magnesium methylate, potassium hydroxide and sodium carbonate, although other alkaline metallic compounds may be substituted. Although the function of the catalyst has not been completely determined, it is believed that the active element is in all cases a metal alkyl carbonate formed from the catalyst which is actually added.

β-Amino alcohols in general are suitable, even though they contain an additional functional group. These amino alcohols will react with one equivalent of alkyl carbonate to give the 2-oxazolidone. The resulting 2-oxazolidone may, however, be made to undergo further reaction with the alkyl carbonate where an additional functional group is present, to give more complex products.

The reaction materials must be free of moisture before the reaction will begin. The system may be dried conveniently by distilling off moist alkyl carbonates, or by adding toluene and distilling off a mixture of toluene and water. Other methods may also be employed to remove moisture from the system.

Wherever the term "alkyl" appears, it will be understood that cycloalkyl radicals or compounds are included. Likewise where the term "alkyl" or "aryl" appears, it will be understood that substituted alkyls or aryls are likewise suitable, as are aralkyls.

The following examples illustrate the invention:

EXAMPLE 1

Ethanolamine

A three-necked flask was fitted with a mechanical stirrer and an efficient fractionating column. Ethanolamine (61 g.), diethyl carbonate (150 ml.), and sodium methylate (0.5 g.) were placed in the flask. The reaction mixture was stirred and the flask was heated in an oil bath. As the reaction progressed, alcohol was formed and was removed as distillate at the head of the column. A total of 112 ml. of alcohol, corresponding to two moles per mole of ethanolamine, was obtained. The residue in the flask solidified on cooling; it was recrystallized from 100 ml. of chloroform. Two crops of 2-oxazolidone were obtained, weighing a total of 57 g., and representing 65% of the theoretical yield. The product melted at 87–89° C.

2-oxazolidone (3 g.) was acetylated by boiling ing with acetic anhydride (20 ml.) and sodium acetate (1 g.) for 1.5 hours. Excess acetic anhydride was distilled off under reduced pressure and the residue was recrystallized from a mixture of benzene and ether. After sublimation in a high vacuum at 65° C. the pure 3-acetyl-2-oxazolidone melted at 69–70° C. It was soluble in water and its solution was neutral to litmus. Analysis of the new compound gave 10.9% nitrogen, compared to the theoretical calculated for $C_5H_7O_3N$ of 10.85%.

Boiling 2-oxazolidone (9 g.) with acetyl chloride (11 ml.) for one hour was accompanied by the evolution of hydrogen chloride. Recrystallization of the residue from a mixture of benzene and ether gave the 3-acetyl derivative which was identical with the product obtained by the action of acetic anhydride.

EXAMPLE 2

2-amino-2-methyl-1-propanol 2-amino-2-methyl-1-propanol (89 g.) and diethyl carbonate (210 ml.) were placed in the apparatus described in Example 1. The system was dried by distilling off moist diethyl carbonate (40 ml.). The flask was cooled and sodium methylate (0.5 g.) was added as a catalyst, and then heating was continued. As the reaction progressed, alcohol was formed and a total of 115 ml. was obtained as distillate. Excess diethyl carbonate was removed by distillation under reduced pressure. The residue solidified on cooling. The product was purified by recrystallization from a mixture of alcohol and petroleum ether. The yield of 4,4-dimethyl-2-oxazolidone was 83 g. or 72% of the theoretical. The product melted at 55–56° C., and was very soluble in water, alcohol or benzene. Analysis of the new compound gave 52.2% carbon, 7.9% hydrogen, and 12.2% nitrogen, compared to the theoretical calculated for $C_5H_9O_2N$ of 52.2%, 7.8% and 12.2% respectively. Determination of the molecular weight gave 112, compared to the theoretical of 115.

EXAMPLE 3

2-amino-2-methyl-1-propanol 2-amino-2-methyl-1-propanol (89 g.) and di-n-propyl carbonate (260 g.) were combined in the apparatus described in Example 1, and the system was dried by distilling under 135 mm. pressure until 40 g. of dipropyl carbonate had been collected. A solution of magnesium methylate (0.5 g.) in methyl alcohol (15 ml.) was added, a rapid reaction occurred and methyl alcohol (15 ml.), followed by propyl alcohol (122 ml.) were collected as distillate in 35 minutes. From the residue a good yield of 4,4-dimethyl-2-oxazolidone, identical with the product produced in Example 2, was obtained.

EXAMPLE 4

2-amino-1-butanol 2-amino-1-butanol (89 g.) and diethyl carbonate (350 ml.) were placed in the apparatus described in Example 1, and the system was dried by distilling under 200 mm. pressure until 55 ml. of diethyl carbonate had been collected. Sodium methylate (1 g.) was added as a catalyst and the reaction mixture was heated at atmospheric pressure. Alcohol was formed as the reaction proceeded, and a total of 120 ml. was collected as distillate. Excess diethyl carbonate was distilled off under reduced pressure. The residue was crystallized from a mixture of chloroform and petroleum ether by cooling with solid carbon dioxide. The yield of 4-ethyl-2-oxazolidone was 57 g. It melted at 16–16.5° C. and its index of refraction was $n_D^{20}$ 1.4631. The product was very soluble in water and the solution was neutral to litmus. Analysis of the new compound gave 52.1% carbon, 7.8% hydrogen and 12.3% nitrogen, compared to the theoretical calculated for $C_5H_9O_2N$ of 52.2%, 7.8% and 12.2% respectively.

EXAMPLE 5

2-amino-3-hexanol 2-amino-3-hexanol (60 g.) and diethyl carbonate (350 ml.) were placed in the apparatus described in Example 1, and the system was dried by distilling until 50 ml. of diethyl carbonate had been collected. Sodium methylate (1 g.) was added as a catalyst and heating was continued until 55 ml. of alcohol had been collected as distillate. The reaction mixture was filtered, excess diethyl carbonate was removed by distillation under reduced pressure, and the residual oil was fractionated through an indented column. 4-methyl-5-propyl-2-oxazolidone was an oil which boiled at 133° C. at 1.5 mm. pressure and its index of refraction was $n_D^{20}$ 1.4581. The yield was 62 g. Analysis of the new compound gave 58.8% carbon, and 9.0% hydrogen, compared to the theoretical calculated for $C_7H_{13}O_2N$ of 58.7% and 9.1% respectively.

EXAMPLE 6

Diethanolamine

Diethanolamine (105 g.), diethyl carbonate (130 g.), and sodium methylate (0.5 g.) were placed in the apparatus described in Example 1, and heated at atmospheric pressure. Alcohol was formed as the reaction progressed, a total of 115 ml. being collected in 1.25 hours; this corresponds to two moles of alcohol per mole of diethanolamine. Excess diethyl carbonate was removed by distillation under reduced pressure. The residue of crude 3-(2-hydroxyethyl)-2-oxazolidone was a viscous liquid which was soluble in water and insoluble in ether. A sample was purified by molecular distillation in a high vacuum at about 175° C. Analysis of the new compound gave 46.0% carbon, and 6.7% hydrogen, compared to the theoretical calculated for $C_5H_9O_3N$ of 45.8% and 6.9% respectively.

A sample of the product (3.5 g.) was dissolved in a little chloroform and phenylisocyanate (2.8 g.) dissolved in ether was added. The solvents were boiled off and the residue was recrystallized from benzene. The phenyl urethane of 3-(2-hydroxyethyl)-2-oxazolidone melted at 101–102° C. Analysis of the new compound gave 11.2% nitrogen, compared to the theoretical calculated for $C_{12}H_{14}O_2N_2$ of 11.2%.

3-(2-hydroxyethyl)-2-oxazolidone (2.5 g.) and benzoyl chloride (2.5 ml.) were heated at 100° C. until hydrogen chloride was no longer evolved. The product was crystallized from methyl alcohol by cooling in solid carbon dioxide and then from a mixture of methyl alcohol and ether. It was sublimed in a high vacuum at 135° C. The benzoate of 3-(2-hydroxyethyl)-2-oxazolidone melted at 69–70° C. Analysis of the new compound gave 5.95% nitrogen, compared to the theoretical calculated for $C_{12}H_{13}O_4N$ of 5.95%.

EXAMPLE 7

2-amino-1-phenyl-1-propanol 2-amino-1-phenyl-1-propanol (50 g.) and diethyl carbonate (350 ml.) were placed in the apparatus described in Example 1, and the system was dried by distilling until 25 ml. diethyl carbonate had been collected. Sodium methylate (1 g.) was added and heating was continued until 38 ml. of alcohol had been obtained as distillate. The reaction mixture was filtered and excess diethyl carbonate was removed by distillation under reduced pressure. The residue was dissolved in chloroform and mixed with petroleum ether. The solid which separated weighed 21 g. After removing the solvent from the mother liquor, the residue was a viscous oil which weighed 37 g. The solid and the oil thus obtained represent diastereomeric mixtures of 4-methyl-5-phenyl-2-oxazolidone. The solid product was recrystallized from a mixture of chloroform and petroleum ether and then from benzene. After sublimation in a high vacuum at 130° C., the product melted at 96–98° C. Analysis of the new product gave 67.9% carbon, 6.0% hydrogen, and 8.0% nitrogen, compared to the theoretical calculated for $C_{10}H_{11}O_2N$ of 67.8%, 6.3% and 7.9% respectively.

The solid, melting at 96–98° C., was dissolved in about 10 parts of warm benzene and allowed to crystallize. The solid which separated was recrystallized, and then sublimed in a high vacuum. The product, a mixture of the 2-oxazolidones derived from the isomers of 2-amino-1-phenyl-1-propanol, melted at 145–147° C. Analysis of the new product gave 7.96% nitrogen, compared to the theoretical calculated for $C_{10}H_{11}O_2N$ of 7.90%.

Example 8

Ephedrine

Ephedrine alkaloid (16.5 g.) and dipropyl carbonate (40 g.) were placed in the apparatus described in Example 1, and the system was dried by distilling at a pressure of 100 mm. until 15 ml. of dipropyl carbonate had been collected. Sodium methylate (0.2 g.) was added and the reaction mixture was heated at atmospheric pressure in an oil bath at 160° C. The temperature of the reaction mixture was about 131° C., and 14 ml. of propyl alcohol, B. P. 95° C., were collected as distillate. Then the pressure was reduced to 100 mm. and the excess dipropyl carbonate was distilled off. The residue was a liquid which solidified on cooling. It was recrystallized from benzene and washed with ether. The yield of 3,4-diethyl-5-phenyl-2-oxazolidone was 17 g. or 89% of the theoretical.

The product melted at 90–92° C., sublimed in a high vacuum at 90° C., was soluble in chloroform or benzene, and less soluble in water or ether. The solution in water was neutral to litmus. Analysis gave 7.3% nitrogen, compared to the theoretical calculated for $C_{11}H_{13}O_2N$ of 7.3%. The compound was levo rotatory, $[\alpha]_D^{27}$ being —95° when 0.6563 g. of the substance was made up to 25 ml. of solution with 95% alcohol.

Example 9

2-amino-2-methyl-1,3-propanediol 2-amino-2-methyl-1,3-propanediol (52.5 g.)  and diethyl carbonate (59 g.) were placed in the apparatus described in Example 1 and heated by an oil bath. Alcohol began to be collected at the head of the column when the temperature of the reaction mixture was 120° C. A total of 44 g. of alcohol was collected as distillate in two hours. At the end of the heating period, the temperature of the reaction mixture was 179° C. The product solidified on cooling. It weighed 65 g. Recrystallization from anhydrous alcohol (75 ml.) gave a first crop weighing 50 g., and a second crop weighing 14 g. The pure 4-methyl-4-hydroxmethyl-2-oxazolidone melted at 115–116.5° C. The product sublimed in a high vacuum at 135° C. It was soluble in water and the solution was neutral to litmus. Analysis of the new compound gave 46.0% carbon, 6.7% hydrogen, and 10.7% nitrogen, compared to the theoretical calculated for $C_5H_9O_3N$ of 45.8%, 6.9% and 10.7% respectively.

A sample of the product (4.4 g.) was mixed with phenylisocyanate (6 ml.) and heated at 100° C. for 1.5 hours. The product solidified on cooling and was recrystallized from a mixture of chloroform and ether. The phenyl urethane of 4-methyl-4-hydroxymethyl-2-oxazolidone melted at 133–134° C. It was soluble in methyl alcohol, acetone or chloroform, and insoluble in water or ether. Analysis gave 11.3% of nitrogen, compared to the theoretical calculated for $C_{12}H_{14}O_4N_2$ of 11.2%.

Example 10

Monoethyl ethanolamine

Monoethyl ethanolamine (45 g.) and diethyl carbonate (350 ml.) were placed in the apparatus described in Example 1 and the system was dried by distilling at 200 mm. pressure until 50 ml. of diethyl carbonate had been collected. Sodium methylate (1 g.) was added, and heating was continued at atmospheric pressure until 58 ml. of alcohol had been obtained as distillate. Fractionation gave two products: 3-ethyl-2-oxazolidone (42 g.), B. P. 92° C. at 1 mm., $n_D^{28}$ 1.4490; and an oil, B. P. 105° C. at 1 mm., $n_D^{28}$ 1.4308. 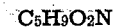 The 3-ethyl-2-oxazolidone was soluble in water, giving a solution which was neutral to litmus; the pure compound appeared to be hydroscopic. Analysis of the new compound gave 11.4% nitrogen, compared to the theoretical calculated for $C_5H_9O_2N$ of 12.1%.

The oil, B. P. 105° C. at 1 mm., was the ethyl carbonic ester of N-ethyl-N-(β-hydroxyethyl) urethane:

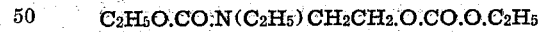

$C_2H_5O.CO.N(C_2H_5)CH_2CH_2.O.CO.O.C_2H_5$

Analysis gave 6.0% nitrogen, compared to the theoretical calculated for $C_{10}H_{19}O_5N$ of 6.0%.

Example 11

Monoethyl ethanolamine

Monoethyl ethanolamine (45 g.) and dibutyl carbonate (134 g.) were placed in the apparatus described in Example 1, and the system was dried by distilling at 42 mm. pressure until 32 g. dibutyl carbonate had been collected as distillate. Magnesium methylate (0.5 g.) dissolved in methanol (15 ml.) was added, and the reaction mixture was heated to about 150° C. at atmospheric pressure. Methanol (13 ml.) and butyl alcohol (40 ml.) were obtained as distillate in one hour. Fractionation of the product gave 3-ethyl-2-oxazolidone, B. P. 78° C. at 0.5 mm., $n_D^{27.5}$ 1.4490. The product was identical with the 3-ethyl-2-oxazolidone obtained in Example 10.

Example 12

Mono-n-butyl ethanolamine

Mono-n-butyl ethanolamine (58.5 g.), dibutyl carbonate (102 g.) and toluene (40 ml.) were placed in the apparatus described in Example 1. The toluene was distilled off to dry the system. Potassium hydroxide (1 g.) was added as a catalyst, and heating was continued at 690 mm. pressure, 70 ml. of butyl alcohol being obtained as distillate in 0.5 hour. The reaction mixture was filtered to remove the little solid matter present. Fractionation gave 3-n-butyl-2-oxazolidone, B. P. 94° C. at 1 mm., $n_D^{27.5}$ 1.4515. The yield was 83% Analysis of the new compound gave 9.5% nitrogen, compared to the theoretical calculated for $C_7H_{13}O_2N$ of 9.8%.

Example 13

Phenyl ethanolamine

Phenyl ethanolamine (68.5 g.), dibutyl carbonate (102 g.) and toluene (40 ml.) were placed in the apparatus described in Example 1, and the toluene was distilled off to dry the system. Anhydrous sodium carbonate (1 g.) was added, and heating was continued at about 170° C. at atmospheric pressure. Butyl alcohol was formed rapidly, 90 ml. being collected as distillate in 0.5 hour. After cooling, the reaction product was dissolved in hot chloroform (150 ml.), treated with decolorizing carbon, and allowed to crystallize. The product was washed with petroleum ether. A total of 81 g. of 3-phenyl-2-oxazolidone, M. P. 120–122.5° C., was obtained. Analysis of the product gave 8.3% nitrogen, compared to the theoretical calculated for $C_9H_9O_2N$ of 8.6%.

Example 14

Tris-(hydroxymethyl)-aminomethane

Tris-(hydroxymethyl)-aminomethane (60.5 g.), dipropyl carbonate (76 g.) and toluene (100 ml.) were placed in the apparatus described in Example 1. The system was dried by distilling until 15 ml. of toluene had been collected. After addition of sodium methylate (0.5 g.) propyl alcohol was formed, and a mixture of it with toluene was taken off as distillate. The residue remaining in the reaction flask was a syrupy liquid which was dissolved in hot water; the solution was filtered and evaporated to dryness. The residue was purified by crystallization from acetone and then from anhydrous alcohol. The 4,4-di-(hydroxymethyl)-2-oxazolidone melted at 109–110° C.; it was soluble in water, giving a solution which was neutral to litmus.

A sample of product (0.5 g.) and benzoyl chloride (1.5 ml.) were heated together for 1.5 hours. The solid residue was heated with 10 ml. anhydrous alcohol to destroy excess benzoyl chloride, and purified by recrystallization from 95% alcohol. The benzoyl derivative melted at 175.5–176° C.

Example 15

Diethanolamine

Diethanolamine (105 g.), diethyl carbonate (300 ml.), and sodium methylate (0.5 g.) were placed in the apparatus described in Example 1. The reaction mixture was heated at atmospheric pressure until 96.5 g. of alcohol, B. P. 78–79° C., had been collected as distillate. Then fractionation was continued at 150 mm. pressure and 35.5 g. more alcoholic distillate was collected at 50° C. at the head of the column. The total alcohol obtained was 132 g. corresponding to 2.87 moles per mole of diethanolamine. Excess diethyl carbonate was removed from the reaction mixture by distillation under reduced pressure. The residue was a viscous oil weighing 180 g. This was mixed with 50 ml. anhydrous alcohol and allowed to crystallize, yielding 46 g. of a solid product. The mother liquor was stripped of alcohol, and the residue was mixed with 100 ml. methyl alcohol and cooled in solid carbon dioxide. A second crop of solid product weighing 28 g. was obtained, making a total of 74 g. The remainder of the material failed to crystallize.

The solid product was purified by recrystallization from alcohol. It melted at 106–108° C., could not be sublimed, and was soluble in water, glacial acetic acid, hot alcohol, or hot chloroform. It was sparingly soluble in benzene, ether or diethyl carbonate.

From the method of synthesis, properties, and analysis of the new compound it was bis [2-(2-oxo-3-oxazolidyl) ethyl] iminodiethylene carbonate having the structure shown below.

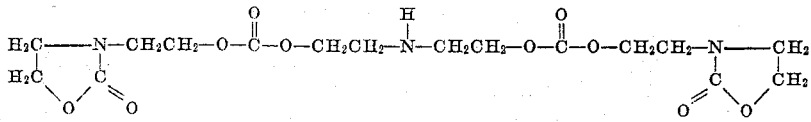
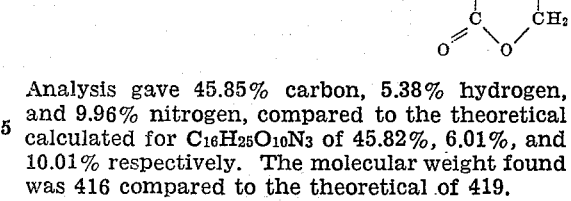

Analysis gave 45.85% carbon, 5.38% hydrogen, and 9.96% nitrogen, compared to the theoretical calculated for $C_{16}H_{25}O_{10}N_3$ of 45.82%, 6.01%, and 10.01% respectively. The molecular weight found was 416 compared to the theoretical of 419.

Example 16

2-amino-2-methyl-1,3-propanediol 2-amino-2-methyl-1,3-propanediol (52.5 g.) and diethyl carbonate (600 ml.) were placed in the apparatus described in Example 1. The reaction mixture was heated at atmospheric pressure by an oil bath at 150° C. The temperature of the liquid in the flask was 130° C. and 45 ml. of diethyl carbonate, B. P. 123° C., were collected as distillate during 30 minutes. No alcohol was formed. After cooling somewhat, sodium methylate (1 g.) was added as a catalyst. Then heating was resumed and alcohol was fractionated out of the reaction mixture at reduced pressure. 85 ml. of alcohol were collected at 48.50° C. under 200 mm. pressure during 1.7 hours. This alcohol corresponded to 3 moles per mole of 2-amino-2-methyl-1,3-propanediol used as starting material. The reaction mixture was filtered to remove the trace of solid which had formed, and the excess diethyl carbonate was removed by distillation under reduced pressure. The residue was an oil which weighed 100 g. It was soluble in water, benzene, acetic acid, or ethyl acetate, but was insoluble in ether. It failed to crystallize and attempts to distill it resulted in decomposition. Analysis of the new product gave 47.0% carbon, 6.5% hydrogen and 7.8% nitrogen.

Material similar to the product described above was produced also by the further reaction of 4-methyl-4-hydroxymethyl-2-oxazolidone with diethyl carbonate in the presence of a trace of sodium methylate. 4-methyl-4-hydroxymethyl-2-oxazolidone (26 g.) from Example 9 and diethyl carbonate (300 ml.) were placed in the apparatus described in Example 1. The reaction mixture was heated at atmospheric pressure and 30 ml. of diethyl carbonate were collected as distillate. No alcohol was formed. Sodium methylate (0.5 g.) was added as a catalyst, and then 17 ml. of alcoholic distillate, B. P. 79–81° C., were collected. Then the temperature at the head of the column rose rapidly to the boiling point of diethyl carbonate. The amount of alcohol corresponds to one mole per mole of the oxazolidone used as starting material. The reaction mixture was filtered to remove the trace of solid which had formed and excess diethyl carbonate was removed by distillation under reduced pressure. The residue was an oil which weighed 42 g. The material appeared to be entirely similar to the product described in the first paragraph of this example. Analysis of the product gave 46.8% carbon, 7.0% hydrogen and 7.8% nitrogen.

EXAMPLE 17

*Tris-(hydroxymethyl)-aminomethane*

Tris-(hydroxymethyl)-aminomethane (61 g.) and diethyl carbonate (650 ml.) were placed in the apparatus described in Example 1 and heated under 200 mm. pressure until 50 ml. of diethyl carbonate had been distilled off to dry the system. Sodium methylate (1 g.) was added as a catalyst and the mixture was heated at 110–126° C. at atmospheric pressure while 120 ml. of alcohol were collected as distillate. The alcohol obtained corresponded to four moles per mole of the tris-(hydroxymethyl)-aminomethane. A yellowish, taffy-like material separated from the diethyl carbonate and was removed by filtration; it weighed 69 g. After removal of excess diethyl carbonate from the mother liquor by distillation an oil remained as a residue. The products failed to crystallize and decomposed when sublimation was attempted. They were polymeric substances.

EXAMPLE 18

*2-amino-2-methyl-1-propanol*

2-amino-2-methyl-1-propanol (89 g.), di-sec.-butyl carbonate (191 g.), xylene (100 ml.), and benzene (50 ml.) were combined in the apparatus described in Example 1 and 40 ml. of benzene were distilled off to dry the system. A suspension of potassium sec.-butyl carbonate (0.5 g.) in 25 ml. of sec.-butyl alcohol was added as a catalyst. The salt was prepared by dissolving potassium metal in sec.-butyl alcohol and saturating the solution with dry carbon dioxide. The reaction mixture was then heated at atmospheric pressure and 149 ml. of sec.-butyl alcohol was collected as distillate during two hours. The solvent, xylene, was removed by distillation under 110 mm. pressure. The residue remaining in the reaction flask was worked up for 4,4-dimethyl-2-oxazolidone as in Example 2. The yield was 74 g., or 65% of the theoretical.

EXAMPLE 19

*d-Ephedrine* d-Ephedrine (8.25 g.) and xlyene (110 ml.) were placed in the apparatus described in Example 1. The system was dried by distilling off 20 ml. of xylene under 150 mm. pressure. Di-n-propyl carbonate (14.6 g.) was added; sodium methylate (0.2 g.) was added as a catalyst, and the reaction mixture was heated for two hours. Propyl alcohol (7 ml.) was collected as distillate. The solution remaining in the flask was treated with decolorizing carbon and then the solvent was removed by distillation under reduced pressure. The residue weighing 9.8 g. solidified on cooling. It was washed with petroleum ether and recrystallized from benzene and petroleum ether. The purified 3,4-dimethyl-5-phenyl-2-oxazolidone weighed 6.7 g. and melted at 92–92.5° C. The compound was dextro rotatory $[\alpha]_D^{35}$ being +94.5° when 0.5385 g. of the substance was made up to 25 ml. of solution with 95% alcohol.

EXAMPLE 20

*dl-Norephedrine* dl-Norephedrine (10 g.), diethyl carbonate (25 g.), xylene (100 ml.) and benzene (25 ml.) were combined in the apparatus described in Example 1, and the system was dried by distilling until the benzene had been removed. After cooling somewhat, sodium methylate (0.3 g.) was added as a catalyst and heating was continued at atmospheric pressure for two hours. About 15 ml. of distillate were collected which contains about 5.7 ml. of alcohol. The reaction mixture was distilled to dryness under 50 mm. pressure. The residue crystallized on cooling. It was dissolved in hot benzene and filtered to remove inorganic impurities. The filtrate was evaporated to a small volume and mixed with petroleum ether. The 4-methyl-5-phenyl-2-oxazolidone which crystallized weighed 9.7 g. and melted at 145–146° C. A mixture of this product with the high melting diastereomeric isomer, described in Example 7, melted at 145–146° C.

EXAMPLE 21

*2-amino-1-phenyl-1-propanol*

2-amino-1-phenyl-1-propanol (100 g.) and xylene (125 ml) were combined in the apparatus described in Example 1, and the system was dried by distilling under 160 mm. pressure until 30 ml. of xylene had been collected. Diethyl carbonate (91.5 g.) and sodium methylate (0.5 g.) were added and heating was then continued at atmospheric pressure, 78 ml. of alcohol being collected during two hours. The hot solution remaining in the reaction flask was filtered and allowed to crystallize. The solid product which separated melted at 93–100° C. and weighed 86.5 g. The mother liquor was freed of solvent by distillation and there remained 31.1 g. of a liquid residue. These products represent mixtures of the diastereomers of 4-methyl-5-phenyl-2-oxazolidone. By fractional crystallization of the solid product from benzene and absolute alcohol, there was obtained 4-methyl-5-phenyl-2-oxazolidone, M. P. 146–147° C., which was identical with that prepared from dl-norephedrine, as described in Example 20. There was also obtained from the mother liquors another diastereomer, M. P. 96–96.5° C., which is derived from dl-isonorephedrine.

The 2-oxazolidones are neutral substances soluble in water and organic solvents. They do not appear to form salts with acids or bases, nor do they appear to react with bromine. In general, their solubility in water decreases as the length of the carbon chain substituents increases. They are physiologically active.

Attention is directed to my copending applications, Serial Nos. 648,206 and 648,208, filed concurrently herewith.

In view of the above, it will be seen that the several objects of the invention are achieved and other advantageous results attained.

As many changes could be made in the above methods and products without departing from the scope of the invention, it is intended that all matter contained in the above description shall be in-

I claim:

1. The method of making 2-oxazolidones which are twice substituted in the 4-position which comprises mixing a β-alkyl β-amino alcohol in which the amino group is attached to a tertiary carbon atom, a dialkyl carbonate and an alkaline metallic compound catalyst under substantially anhydrous conditions, and condensing the moisture-free mixture to directly form a 2-oxazolidone.

2. The method of making 2-oxazolidones which are twice substituted in the 4-position which comprises mixing a β-alkyl β-amino alcohol in which the amino group is attached to a tertiary carbon atom, a dialkyl carbonate and an alkaline metallic compound catalyst under substantially anhydrous conditions, and heating the mixture to directly condense the amino alcohol and carbonate to form a 2-oxazolidone.

3. The method of making 2-oxazolidones which are twice substituted in the 4-position which comprises mixing a β-alkyl β-amino alcohol in which the amino group is attached to a tertiary carbon atom with a dialkyl carbonate, said mixture inherently containing moisture, drying said mixture, adding an alkaline metallic compound catalyst, heating the resultant mixture under substantially anhydrous conditions to directly condense the amino alcohol and carbonate to form a 2-oxazolidone and to remove alcohol formed by the reaction.

4. The method of making 2-oxazolidones which are twice substituted in the 4-position which comprises mixing a β-alkyl β-amino alcohol in which the amino group is attached to a tertiary carbon atom, with a dialkyl carbonate, said mixture inherently containing moisture, heating the mixture to remove substantially all of said moisture, adding an alkaline metallic compound catalyst to the moisture-free mixture, and heating the resultant mixture to directly form a 2-oxazolidone.

5. The method of making 2-oxazolidones which are twice substituted in the 4-position which comprises mixing a β-alkyl β-amino alcohol in which the amino group is attached to a tertiary carbon atom, with a dialkyl carbonate, said mixture inherently containing moisture, heating the mixture under reduced pressure to remove substantially all of said moisture, adding an alkaline metallic compound catalyst to the moisture-free mixture, and heating the resultant mixture at atmospheric pressure to directly form a 2-oxazolidone.

6. The method of making 2-oxazolidones which are twice substituted in the 4-position which comprises mixing a β-alkyl β-amino alcohol in which the amino group is attached to a tertiary carbon atom, with a dialkyl carbonate, said mixture inherently containing moisture, heating the mixture to distill off a minor proportion of the dialkyl carbonate with substantially all the moisture, adding as a catalyst an alkali metal alcoholate, and condensing the resultant mixture to directly form a 2-oxazolidone.

7. The method of making 2-oxazolidones which are twice substituted in the 4-position which comprises mixing a β-alkyl β-amino alcohol in which the amino group is attached to a tertiary carbon atom, with a dialkyl carbonate, said mixture inherently containing moisture, heating the mixture to distill off moist dialkyl carbonate under reduced pressure conditions, adding as a catalyst an alkaline earth metal alcoholate, and subjecting the mixture to distillation to directly condense the amino alcohol and carbonate to form a 2-oxazolidone and for continuously removing alcohol formed in the reaction.

8. The method of making 4,4-dimethyl-2-oxazolidone which comprises condensing 2-amino-2-methyl-1-propanol with diethyl carbonate to directly form 4,4-dimethyl-2-oxazolidone.

9. The method of making 4,4-dimethyl-2-oxazolidone which comprises condensing 2-amino-2-methyl-1-propanol with dipropyl carbonate to directly form 4,4-dimethyl-2-oxazolidone.

10. The method of making 4,4-dimethyl-2-oxazolidone which comprises preparing an anhydrous mixture of 2-amino-2-methyl-1-propanol and a dialkyl carbonate, said reagents inherently containing moisture, adding to the resultant mixture an alkaline metal alcoholate as a catalyst and heating the resultant mixture to directly form the 2-oxazolidone and to distill off alcohol formed by the reaction.

11. The method of making 4,4-dimethyl-2-oxazolidone which comprises mixing 2-amino-2-methyl-1-propanol with diethyl carbonate, said mixture inherently containing moisture, distilling the mixture under reduced pressure until a minor proportion of the dialkyl carbonate is removed with substantially all the moisture content of the mixture, adding as a catalyst for the resulting mixture sodium methylate and heating the resultant mixture under atmospheric pressure to directly form the 2-oxazolidone and to distill off alcohol formed by the reaction.

12. The method of making 4,4-dimethyl-2-oxazolidone which comprises mixing 2-amino-2-methyl-1-propanol with di-n-propyl carbonate, said mixture inherently containing moisture, distilling the mixture under reduced pressure until a minor proportion of the di-n-propyl carbonate is removed with substantially all the moisture content of the mixture, adding as a catalyst for the resulting mixture magnesium methylate and heating the resultant mixture under atmospheric pressure to directly form the 2-oxazolidone and to distill off alcohol formed by the reaction.

13. The method of making 4-methyl-4-hydroxymethyl-2-oxazolidone which comprises condensing 2-amino-2-methyl-1,3-propanediol with diethyl carbonate to directly form 4-methyl-4-hydroxymethyl-2-oxazolidone.

14. The method of making 4-methyl-4-hydroxymethyl-2-oxazolidone which comprises preparing an anhydrous mixture of 2-amino-2-methyl-1,3-propanediol and a dialkyl carbonate, said reagents inherently containing moisture, adding to the resultant mixture an alkaline metal alcoholate as a catalyst and heating the resultant mixture to directly form the 2-oxazolidone and to distill off alcohol formed by the reaction.

15. The method of making 4-methyl-4-hydroxymethyl-2-oxazolidone which comprises mixing 2-amino-2-methyl-1,3-propanediol with diethyl carbonate, said mixture inherently containing moisture, distilling the mixture under reduced pressure until a minor proportion of the dialkyl carbonate is removed with substantially all the moisture content of the mixture, adding as a catalyst for the resulting mixture sodium methylate and heating the resultant mixture under atmospheric pressure to directly form the 2-oxazolidone and to distill off alcohol formed by the reaction.

16. 4,4-dimethyl-2-oxazolidone.

17. 4-methyl-4-hydroxymethyl-2-oxazolidone.

18. The method of making 4,4-dimethyl-2- oxazolidone which comprises condensing 2-amino-2-methyl-1-propanol with a dialkyl carbonate to directly form 4,4-dimethyl-2-oxazolidone.

19. The method of making 4-methyl-4-hydroxymethyl-2-oxazolidone which comprises condensing 2-amino-2-methyl-1,3-propanediol with a dialkyl carbonate to directly form 4-methyl-4-hydroxymethyl-2-oxazolidone.

AUGUST H. HOMEYER.

REFERENCES CITED

The following references are of record in the file of this patent:

UNITED STATES PATENTS

| Number | Name | Date |
|---|---|---|
| 2,215,038 | Hedgins | Sept. 17, 1940 |
| 2,399,118 | Homeyer | Apr. 23, 1946 |